May 31, 1932. H. QUIST 1,861,162
PORTABLE LINK SAWING MACHINE
Filed Feb. 17, 1932 3 Sheets-Sheet 1
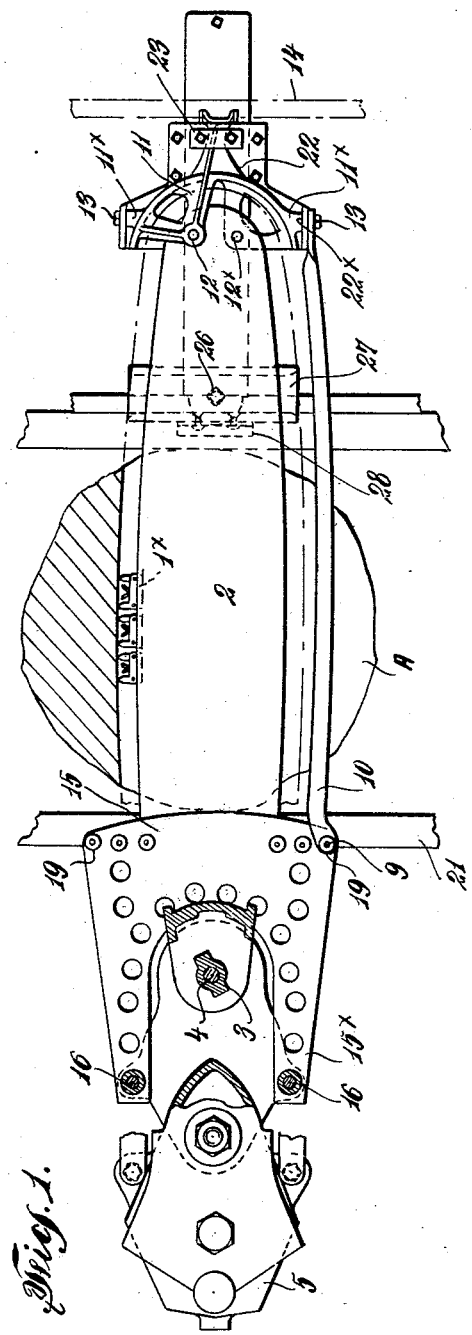
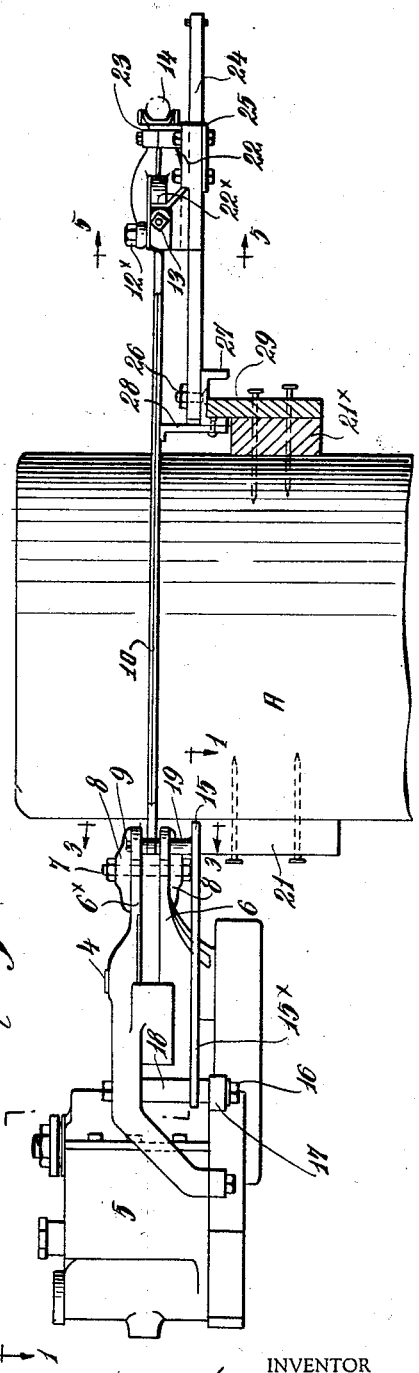
INVENTOR
Henry Quist
BY A. Lee Helms
ATTORNEY

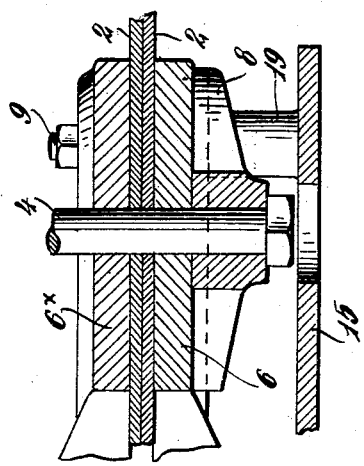
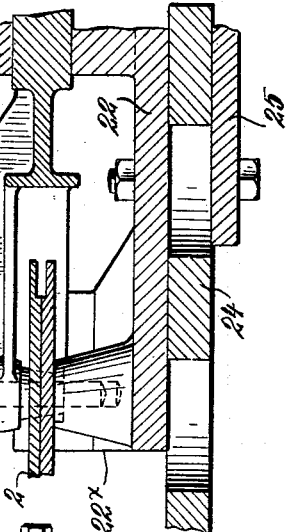
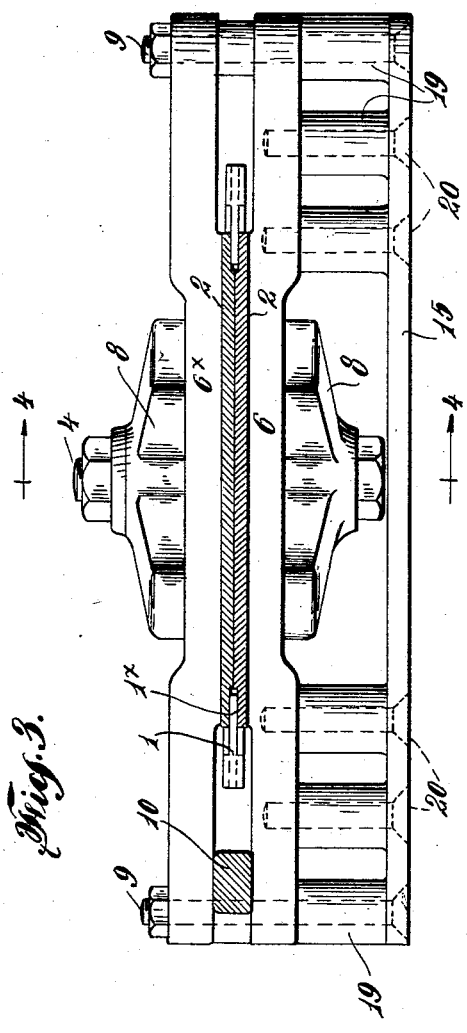
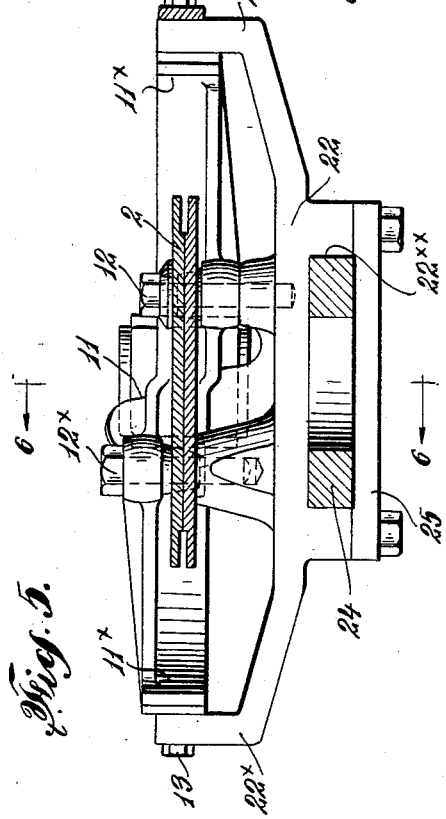

May 31, 1932. H. QUIST 1,861,162
PORTABLE LINK SAWING MACHINE
Filed Feb. 17, 1932 3 Sheets-Sheet 3

INVENTOR
Henry Quist
BY
H. Lee Nelson
ATTORNEY

Patented May 31, 1932

1,861,162

UNITED STATES PATENT OFFICE

HENRY QUIST, OF BROOKLYN, NEW YORK

PORTABLE LINK SAWING MACHINE

Application filed February 17, 1932. Serial No. 593,442.

The present invention relates to portable link sewing machines and has for its object to provide adjustable supporting and guiding means particularly adapted for use in the cutting of vertical piles and the like in which work the weight of the machines must be supported in order to keep the saw frame free in the cut and to insure cutting at the predetermined angle desired.

By means of the present invention, a guide plate is rigidly carried by the machine at the motor end thereof and at the opposite end of the machine there is applied an endwise adjustable guide and supporting bar having a transverse channel guideway and an upwardly extending saw frame supporting arm. The plate and guideway engage battens applied to the pile and the plate, bar, and arm afford a true support and guide for the machine in its cutting action transversely of a pile, or the like.

The invention will be described with reference to the accompanying drawings, in which Fig. 1 is a plan view, partly in section, showing a machine constructed in accordance with the invention, the section being on the line 1—1, Fig. 2, the machine being shown in position near the end of a cut through a pile.

Fig. 2 is an elevation of the same.

Fig. 3 is a transverse section on the line 3—3, Fig. 2.

Fig. 4 is a fragmentary longitudinal section on the line 4—4, Fig. 3.

Fig. 5 is a transverse section on the line 5—5, Fig. 2.

Fig. 6 is a fragmentary section on the line 6—6, Fig. 5.

Figure 7:
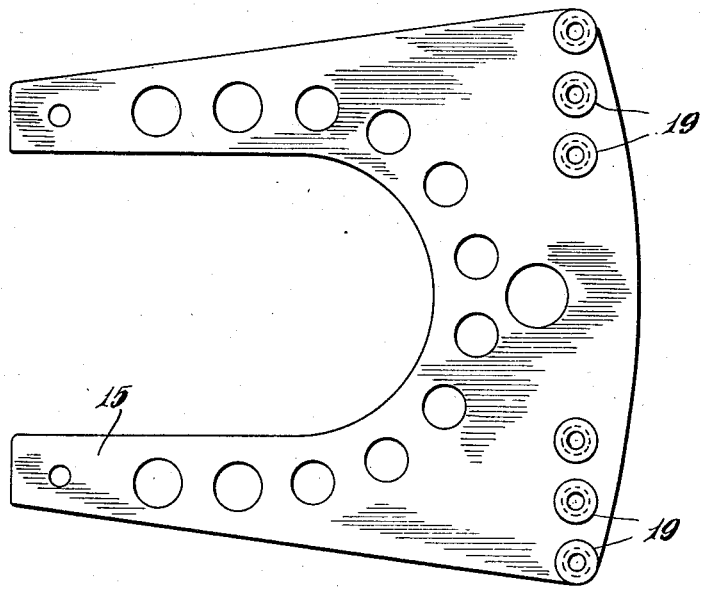
Fig. 7 is a plan view of the motor frame guide plate.
Figure 8:
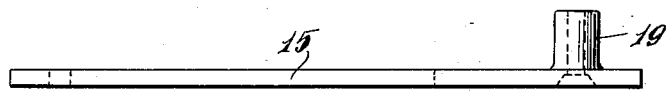
Fig. 8 is a side elevation of the structure shown in Fig. 7.
Figure 9:
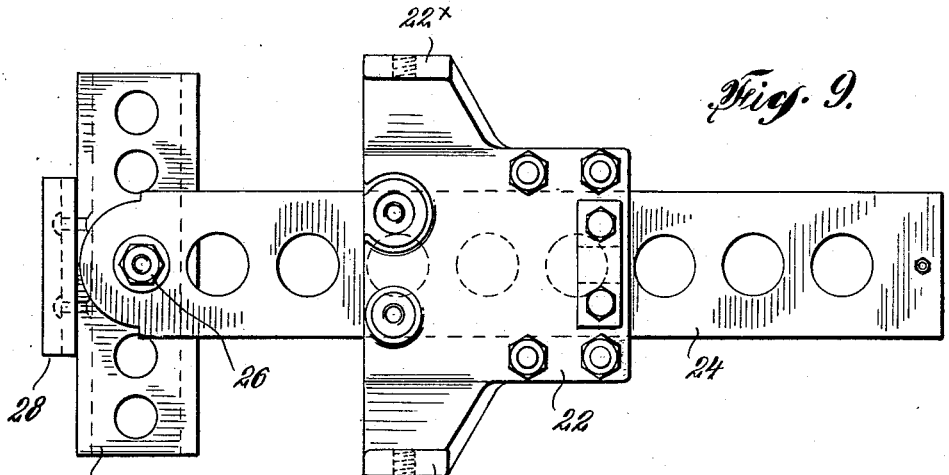
Fig. 9 is a plan view of the yoke-like bracket carrying the bar 24.
Figure 10:
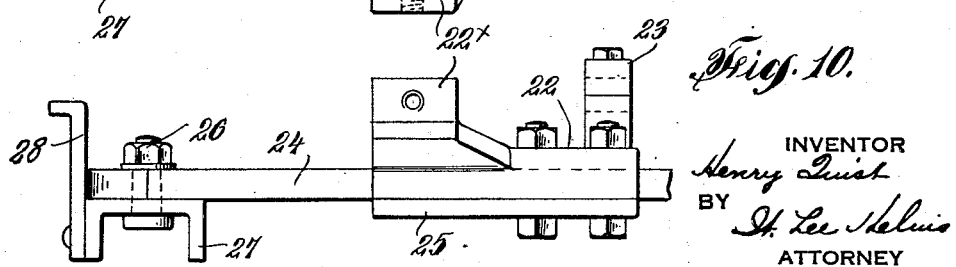
Fig. 10 is a side elevation of the same.

Referring to the drawings, the machine comprises a link saw indicated at 1 guided in a frame having an open side and a side closed by a guard. The saw frame comprises a plate or assembled plates 2 with an edge channel in which the link saw travels, the frame being connected at one end to the motor frame and at the opposite end to the guard and support for the handle.

The cutter links of the saw in the present embodiment are of a type wherein are embodied rearwardly extending reduced sections $1x$, the cutting area of the links being exterior to saw frame plates 2, that area being equal to or slightly thicker than the thickness of the frame, the arrangement being such that the edges of the frame form abutting and guiding surfaces for the cutting links in their travel.

At the motor end of the machine the saw links travel over and are driven by a sprocket 3 on a shaft 4 in the motor frame and shaft 4 is rotated by suitable connections with the motor 5, the driving elements forming no part of the present invention and not being shown in detail. At the motor end of the machine the saw frame 2 is clamped between the bracket arms 6 and $6x$ of the motor frame, and are bolted thereto by means of the bolt 7 passing through upper and lower clamped spiders 8. At their outer sides arms 6 and $6x$ are spaced and apertured to receive bolts 9 so that one end of the saw guard 10 may be secured in position to guard the saw at one side of the saw frame or the other, as desired.

From sprocket 3 the saw is led forwardly to the forward end of the saw frame, being guided thereby, the reduced inner extensions of the saw links extending between the channelled walls of the saw frame and the cutting portions of the saw links abutting the edge of the saw frame and being given a bearing thereby.

At the handle end of the machine just referred to, the saw frame is bolted to a guard and handle support member 11 having a curved face abutting the cutting edge of the saw bolts 12, $12x$ passing through member 11 and the plates of the saw frame. Member 11 is formed with lateral extending arms $11x$ to either of which may be secured by stud screws 13 one end of the guard 10. A rearwardly extending arm of member 11 may receive and have bolted thereto a handle 14.

To the motor end of the machine I apply a guide plate. In the present embodiment, the guide plate is U-shaped so as to form a broad central section 15 and legs 15x. Near its outer end each leg 15x is apertured to receive a bolt 16 which passes through a lug 17 of the motor frame and thence upwardly through a lateral extension of the arm 6x as shown in Fig. 2, pipe separators 18 surrounding bolt 16 and holding the appropriate leg 16x in the desired vertical position. At each side of this broad central section 15, the guide plate is formed with a plurality of upwardly projecting posts 19, best shown in Fig. 3, to abut bracket arm 6 of the motor frame and to be secured thereto by the bolts 9 and screws 20.

By the above means, the guide plate 15, 15x is rigidly held by the motor frame, and, in turn, is adapted to rigidly support the motor frame when the plate is placed on a suitable surface, as, for example, the batten 21 applied to the post A.

Lying under the guard and handle support 11 is a yoke-like bracket 22 having arms 22x secured by the said stud screws 13 to arms 11x of the guard and handle support 11. The bracket is also strapped to the rearwardly extending arm of guard and handle support 11 by means of strap 23. Bracket 22 is formed at 22xx (Fig. 5) with a channelway to receive an adjustable guide bar 24 which may be held in position by a strap 25. Guide member 24 has swivelled thereto at 26 a channelled cross bar 27 riveted or otherwise secured to an upwardly extending supporting and guiding plate 28 for the saw frame. Channeled cross bar member 27 is adapted to be received upon a batten board 29 secured to batten 21x (Fig. 2).

In the operation of the device, the battens 21, 21x are applied to the pile to be cut, batten 21 being below 21x in the present embodiment, and having applied thereto board 29 to enable straddle thereof by the channelled cross bar 27 as shown in Fig. 2. The battens and board will extend sufficiently to the sides of the pile to enable support of the machine at the instant of cut and at the end of the cut. The machine is lifted and plate 15 placed upon the top of batten 21 simultaneously with the placing on batten board 29 of the cross bar 27. It will be seen that supporting plate 28 supports and properly positions the saw frame and also that to accommodate various pile diameters, plate 28 may be moved with bars 27 and 24 relatively to the guide and handle support 11 and then held in position by tightening the strap 25 upon bar 24 or through the use of any other suitable clamping means for the bar. The bar 24 will be moved outwardly until, in the position of the parts shown in Fig. 2, the left hand flange of channelled bar 27 directly abuts one face of batten board 29. In adjusting bar 24 handle 14 may be employed. The handle may be pulled outwardly, bar 24 moved to proper position and clamped to member 11 whereupon handle 14 may be released. Thus the machine may be held in proper position by mechanical means maintaining longitudinal tension upon the saw frame and by horizontal supporting and guiding means comprising plates 15 and 28 and their associated elements. Supporting and guide plate 28 may be of any suitable length, having a length equal to the width of the saw frame or of lesser length, as desired.

When the machine is placed in position and secured, it may be operated by one man, at the motor end. By connecting the bar 24 to cross bar 27 through the instrumentality of a swivel connection and by rounding the edge of plate 15, which will normally abut the pile, I provide means by which the operator at the motor end of the machine may swing the device on swivel 26 in the arc of a circle relatively to one batten prior to or during the cutting operation, which will be advantageous when close spacing exists between piles or rows of timber being cut.

It will be understood that various modifications may be made in the form and arrangement of the elements comprising the invention without departing from the spirit thereof; what I claim and desire to secure by Letters Patent, being as follows:—

1. In portable link sawing machines, a motor and motor frame connected thereto, a saw frame, a saw having operative connections with the motor and guided within the frame, a guide plate carried by the motor frame, a bracket carried by the saw frame at the end thereof opposite the motor frame, a bar adjustably supported by the bracket, and a supporting plate for the saw frame carried by the bar and movable therewith to various positions lengthwise of the saw frame.

2. In portable link sawing machines, a saw frame, a motor and motor frame connected thereto, a saw having operative connections with the motor and guided by the frame, a guard and handle support connected to the saw frame at the end thereof opposite the motor frame, a guide plate carried by the motor frame, a bracket carried by the guard and handle support, a bar adjustably supported by the bracket and having a depending flange member at its inner end, and a supporting plate for the saw frame carried by the bar and movable therewith to various positions lengthwise of the saw frame.

3. In portable link sawing machines, a saw frame, a motor and motor frame connected thereto, a saw having operative connections with the motor and guided within the frame, a bracket carried by the end of the saw frame opposite the motor frame, a bar adjustably supported by the bracket and a guide and supporting member for the saw frame having a pivotal connection with said bar.

4. In portable link sawing machines, a saw frame, a motor and motor frame connected thereto, the saw having operative connections with the motor and supported by said saw frame, a bracket carried by the saw frame at the end thereof opposite the motor frame, a batten-engaging member having a slidable and pivotal connection with the bracket, and a batten-engaging member carried by the motor frame.

5. In portable link sawing machines, a saw frame, a motor and motor frame connected thereto, a saw having operative connections with the motor and guided by the frame, a guard and handle support connected to the saw frame at the end thereof opposite the motor frame, a batten-engaging guide plate carried by the motor frame and having a curved engaging edge for a pile or the like, a bracket carried by the guard and handle support, a bar adjustably supported by the bracket and having a depending flange member at its inner end for engaging a batten member and a supporting plate for the saw frame carried by the bar and movable therewith to various positions lengthwise of the saw frame, the connection between the supporting plate and the bar being pivotal.

In testimony whereof, I have signed my name to this specification.

HENRY QUIST.